United States Patent Office 3,093,694
Patented June 11, 1963

3,093,694
METHOD FOR PREPARING ISOPROPENYL-SUBSTITUTED ARYL HYDROCARBONS
Frederick J. Soderquist, Essexville, James L. Amos, Midland, and Harold D. Boyce, Coleman, Mich., assignors to The Dow Chemical Company, Midland, Mich., a corporation of Delaware
No Drawing. Filed May 19, 1960, Ser. No. 30,069
9 Claims. (Cl. 260—669)

This invention relates to a process for preparing isopropenyl-substituted aryl hydrocarbons. Specifically, the invention relates to preparing compounds having from one to two isopropenyl substituents in the aryl nucleus.

The starting material employed for carrying out the method of the present invention is a mono- or ditertiary-butyl-substituted aryl hydrocarbon. This starting material may contain in the aryl nucleus one or more substituent groups which are non-reactive under the conditions of the process. Such non-reactive groups may be, for instance, methyl or a halogen having an atomic weight of less than 80.

The method of the present invention is conveniently practiced by passing an aryl hydrocarbon, of the type hereinbefore described, in the gaseous state, through a reaction zone wherein the temperature is maintained at from 500° to 800° C., preferably at from about 650–750° C., cooling and condensing the effluent vapors, and separating the desired isopropenyl-substituted aryl hydrocarbon from the total reaction product.

The reaction can be carried out at atmospheric, sub-atmospheric, or super-atmospheric pressures, as desired; however, as a matter of convenience, atmospheric pressure is preferred.

While a catalyst is not essential, a demethanation catalyst, preferably of the self-regenerating type, and selected from the known species, may be employed in the method of the present invention. Said catalysts are typically composed of iron oxide, zinc oxide, chromium oxide, and activated alumina, taken singly or in combination. The preparation of said catalysts is described in several U.S. Patents (see 2,370,797; 2,395,875; 2,395,876; 2,418,888; and 2,426,829).

The method of the present invention may be carried out with the tertiary-butyl aryl hydrocarbon alone or in admixture with an inert diluent. Suitable diluents include benzene, toluene, steam, nitrogen, and carbon dioxide; virtually any proportion of diluent to aryl hydrocarbon may be used, but proportions from 0.5 to 10 parts by weight of diluent per part of aryl hydrocarbon are preferred.

It is to be understood that n-butyl aryl hydrocarbons are not operable starting materials for the preparation of isopropenyl-aryl hydrocarbons in the method of the present invention. For example, products arising from the use of n-butylbenzene as a starting material include toluene, styrene, naphthalene and indene; however, no detectable amount of isopropenylbenzene is found in the reaction product.

Also, it is known that o-vinyltoluene can be prepared from ortho-n-propyltoluene (see U.S. Patent 2,857,440 to Amos, Soderquist, and Allen). However, in view of this known demethanation of the ortho-n-propyl compound, it is totally unexpected that, in the method of the present invention, the tertiary-butylbenzene is easily demethanated, whereas the n-butylbenzene is totally inoperable.

The practice of the present invention is illustrated by a series of experiments in which a tertiary-butylbenzene, or substituted tertiary-butylbenzene was fed at the rate of 10–30 grams per hour into a stainless steel reactor tube having an inner diameter of 0.8″ and a length of 36″ and maintained vertically in an electric furnace. In some of the experiments, the feed stock was admixed with steam as an inert diluent, while in other experiments a demethanation catalyst was employed, both with and without the diluent. The upper portion of the reactor tube comprised a pre-heat zone for the influent reactant material and was maintained at 200–350° C. The temperature in the central portion of the reactor was maintained constant for each experiment, the feed stock was introduced into the reactor and subjected to that temperature, and the effluent collected. This procedure was then repeated at a series of temperatures ranging from 500–750° C. The effluent gas stream was cooled and condensed by passage through a heat exchanger, and from the condensed product the liquid hydrocarbon layer was isolated and analyzed by infra-red spectrometry.

There are shown in Table I the hydrocarbon employed as feedstock and its feed rate, the feed rate of the steam diluent (when used), the catalyst employed, if any, the rate of recovery of total organic condensate at each of a series of operating temperatures, the percent feed stock converted to other products, and the yield of demethanated product obtained at each temperature, based on the percent feed-stock consumed. For purposes of comparison, n-butylbenzene was also used as feed stock. It is to be

| Experiment No. | Hydrocarbon employed | Feed rate of hydrocarbon, g./hr. | Diluent, g./hr. | Catalyst | Temp., °C. | Recovery rate g./hr. | Hydrocarbon converted, percent | Isopropenyl-benzene yield, percent |
|---|---|---|---|---|---|---|---|---|
| 1 | Tert-butylbenzene | 22.4 | 62.0 | Fe₂O₃-Cr₂O₃ | 600 | 18 | 22 | 30 |
| 2 | do | 22.4 | 62.0 | do | 650 | 17 | 34 | 35 |
| 3 | do | 22.4 | 62.0 | do | 700 | 15 | 62 | 41 |
| 4 | do | 21.4 | None | do | 550 | 20 | 9 | 68 |
| 5 | do | 21.4 | None | do | 600 | 20 | 21 | 57 |
| 6 | do | 21.4 | None | do | 650 | 13 | 66 | 58 |
| 7 | do | 21.4 | None | do | 700 | 9 | 96 | 18 |
| 8 | do | 20.0 | None | None | 600 | 20 | 14 | 76 |
| 9 | do | 20.0 | None | do | 650 | 18 | 55 | 51 |
| 10 | do | 20.0 | None | do | 700 | 15 | 92 | 25 |
| 11 | P-tert-butyltoluene | 19.5 | 61.1 | Activated alumina | 550 | 20 | 13 | 54 |
| 12 | do | 19.5 | 61.1 | do | 600 | 19 | 37 | 46 |
| 13 | do | 19.5 | 61.1 | do | 650 | 11 | 86 | 34 |
| 14 | do | 19.5 | 61.1 | do | 700 | 10 | 99 | 32 |
| 15 | do | 20.8 | 61.8 | None | 650 | 18 | 26 | 65 |
| 16 | do | 20.8 | 61.8 | do | 700 | 18 | 72 | 71 |
| 17 | P-ditert-butylbenzene | 20.4 | 61.4 | do | 700 | 19 | 49 | 24 |
| 18 | do | 20.4 | 61.4 | do | 750 | 17 | 100 | 58 |
| 19 | do | 21.0 | None | Fe₂O₃-ZnO | 700 | 16 | 86 | 36 |
| 20 | do | 21.0 | None | do | 750 | 19 | 100 | 45 |
| 21 | N-butylbenzene | 21.3 | 63.6 | Activated alumina | 600 | 19 | 12 | 0 |
| 22 | do | 21.3 | 63.6 | do | 650 | 18 | 19 | 0 |
| 23 | do | 21.3 | 63.6 | do | 700 | 17 | 47 | 0 |
| 24 | do | 16.8 | None | do | 600 | 15 | 41 | 0 |
| 25 | do | 16.8 | None | do | 650 | 12 | 76 | 0 |
| 26 | do | 16.8 | None | do | 700 | 11 | 76 | 0 | understood that when p-tertiary-butyltoluene and p-ditertiary-butylbenzene were employed as feed stock, the products obtained were p-isopropenyltoluene and p-diisopropenylbenzene, respectively, and that these are the products listed under "Yield."

It is to be understood that in addition to the compounds prepared as hereinbefore described, other starting materials may be employed in the method of the present invention, such as o-ditertiary-butylbenzene, m-ditertiary-butylbenzene, o-tertiary-butyltoluene, m-tertiary-butyltoluene, 2,4-dichloro-tertiary-butylbenzene, 2,5-diphenyl-tertiary-butylbenzene, 3-chloro-1,2-ditertiary-butylbenzene, 4-bromo-1,3-ditertiary-butylbenzene, 5-phenyl-1,2-ditertiary-butylbenzene, 1-tertiary-butylnaphthalene, 2,4-ditertiary-butylnaphthalene, 3-chloro-5-tertiary-butylnaphthalene, 2-methyl-5-tertiary-butylnaphthalene, 3-chloro-5-bromo-8-tertiary-butylnaphthalene, 2,4-ditertiary-butylanthracene, 2-chloro-5-tertiary-butylanthracene, 3-bromo-6-chloro-7-tertiary-butylanthracene, 1-methyl-2-chloro-5-tertiary-butylanthracene, 2-tertiary-butylphenanthrene, 2-chloro-3-methyl-6-tertiary-butylphenanthrene, 2,5-ditertiary-butylphenanthrene, and the like, and analogous products obtained therefrom.

We claim:

1. A process for preparing isopropenyl-substituted aryl compounds having from one to two isopropenyl substituents in the aryl nucleus, said process comprising passing a gaseous tertiary-butyl-substituted aryl compound having from one to two tertiary-butyl groups as the only nuclear substituents reactive in the process, through a reaction zone at a temperature of 500–800° C., thereby effecting substantial demethanation of the tertiary-butyl groups; condensing the effluent vapors and separating the isopropenyl aryl compound from the condensate.

2. A method as defined in claim 1 wherein the tertiary-butyl substituted compound is a tertiary-butylbenzene.

3. A method as in claim 2 wherein the tertiary-butylbenzene fed to the reaction zone is admixed with an inert diluent.

4. A method as in claim 1 wherein the reaction temperature is maintained at between 650° C. and 750° C.

5. A method as in claim 2 wherein the tertiary-butylbenzene is contacted with a demethanation catalyst.

6. A method as in claim 2 wherein the butylbenzene is tertiary-butylbenzene.

7. A method as in claim 2 wherein the butylbenzene is p-ditertiary-butylbenzene.

8. A method as in claim 2 wherein the butylbenzene is p-tertiary-butyltoluene.

9. A method as in claim 3 wherein the inert diluent is steam.

References Cited in the file of this patent

UNITED STATES PATENTS

| | | |
|---|---|---|
| 1,552,875 | Ostromislansky et al. | Sept. 8, 1925 |
| 2,110,830 | Driesbach | Mar. 8, 1938 |
| 2,939,889 | Amos et al. | June 7, 1960 |